United States Patent
Aoki et al.

(10) Patent No.: US 8,327,459 B2
(45) Date of Patent: *Dec. 4, 2012

(54) METHOD AND APPARATUS FOR AUTHENTICATING USAGE OF AN APPLICATION

(75) Inventors: Norihiro Edwin Aoki, Sunneyvale, CA (US); David Alan Bryan, Carmel, NY (US)

(73) Assignee: Time Warner, Inc., New York, NY (US)

( * ) Notice: Subject to any disclaimer, the term of this patent is extended or adjusted under 35 U.S.C. 154(b) by 81 days.

This patent is subject to a terminal disclaimer.

(21) Appl. No.: 12/755,790

(22) Filed: Apr. 7, 2010

(65) Prior Publication Data

US 2010/0199347 A1    Aug. 5, 2010

Related U.S. Application Data

(62) Division of application No. 11/174,441, filed on Jul. 1, 2005, now Pat. No. 7,730,546.

(51) Int. Cl.
*G06F 21/00* (2006.01)

(52) U.S. Cl. ............... 726/28; 726/26; 726/27; 713/166

(58) Field of Classification Search .................. None
See application file for complete search history.

(56) References Cited

U.S. PATENT DOCUMENTS

| | | | | |
|---|---|---|---|---|
| 5,909,589 | A * | 6/1999 | Parker et al. | 712/32 |
| 7,452,278 | B2 | 11/2008 | Chen et al. | 463/42 |
| 8,037,534 | B2 * | 10/2011 | Smith et al. | 726/24 |
| 2002/0023059 | A1 | 2/2002 | Bari et al. | 705/76 |
| 2003/0101348 | A1 | 5/2003 | Russo et al. | 713/185 |
| 2004/0083394 | A1 | 4/2004 | Brebner et al. | 713/202 |
| 2005/0060565 | A1 | 3/2005 | Chebolu et al. | 713/200 |
| 2005/0160297 | A1 * | 7/2005 | Ogawa | 713/202 |
| 2006/0242424 | A1 | 10/2006 | Kitchens et al. | 713/183 |

OTHER PUBLICATIONS

Requirement for Restriction / Election, issued by U.S. Appl. No. 11/174,441, filed Mar. 6, 2009 (6 pages).
Non-Final Office Action, issued by U.S. Appl. No. 11/174,441, filed Jun. 24, 2009 (9 pages).

* cited by examiner

*Primary Examiner* — Ponnoreay Pich
(74) *Attorney, Agent, or Firm* — Proskauer Rose LLP

(57) ABSTRACT

Methods and apparatuses, including computer program products, are described for authenticating the usage of an application. A request to execute an application is received from a user device. The application is executed based on the request. An application-level usage indicator is received from the user device. The application-level usage indicator corresponds to current operation of the application by a user and comprises at least (i) user input commands and (ii) passive usage metrics. The identity of the user is determined by comparing the application-level usage indicator with a pre-established user profile wherein the user profile is associated with previous operation of the application by the user and comprises at least (i) user input commands and (ii) passive usage metrics. Execution of the application is terminated at the user device if the identified user is not entitled to use the application according to the user profile.

24 Claims, 14 Drawing Sheets

APPLICATION/CONTENT ALLOWANCE TABLE 300

| APPLICATION CONTENT IDENTIFIER 305 | MINIMUM CONFIDENCE LEVEL 310 | ERR IN FAVOR 315 | ENTITLED USER 320 |
|---|---|---|---|
| WORD PROCESSOR | 10% | | USER 1 |
| MUSIC A | 40% | | USER 1 |
| VIDEO A | 40% | | USER 1 |
| | | | |

FIG. 13

METHOD AND APPARATUS FOR AUTHENTICATING USAGE OF AN APPLICATION

RELATED APPLICATION

This application is a divisional application of Ser. No. 11/174,441, filed on Jul. 1, 2005, the entire disclosure of which is incorporated herein by reference.

BACKGROUND

A wide variety of applications are now available for various computing platforms. Many of these applications comprise licensed software. In the past, it was not very common for one user to share an execution platform with another user. However, as the size of an execution platform has been reduced with advances in technology, it is now very common for users to share the hardware platform that is used to execute a particular application. In this sense, when an application is installed on a particular hardware platform—for example, a notebook computer, a personal organizer or a media access device—that application can be used by the borrowing user.

Not only can a borrowing user use an application that is installed on an execution platform that the user has borrowed, the borrowing user can in many instances access digital content by using a particular application that is also installed on a borrowed hardware platform. As such, where the borrowing user has borrowed, for example, a media access device, the borrowing user can enjoy content that is owned or licensed to the user that actually owns the execution platform. Such access is becoming more and more prevalent. The concern is that a borrowing user is able to use applications or enjoy content that has been licensed to a different user, i.e. the user that loaned the execution platform to the borrowing user.

There are many ways which have already been devised for identifying a particular user before granting access to an application or to some form of digital content. The ubiquitous password is often used to identify a particular user. The problem with using a password is that the owner of the execution platform can simply provide the password to the borrowing user. Again, the borrowing user is allowed to use an application or to enjoy content that is rightfully licensed to the owner of the execution platform. Another technique for identifying a current user relies on some form of token. A token can include such items as a smart card, a card with a magnetic stripe, or a dongle that can be communicatively associated with the execution platform in order to identify a particular user. It should be appreciated that a dongle or any other token is typically associated with a valid access license and is not necessarily associated with a user. Again, a borrowing user can simply obtain the token from the owner of the execution platform.

More sophisticated means for identifying a current user rely on biometrics. The biometrics refers to the mechanics of identifying a physical characteristic for a particular user. For example, a fingerprint, a retinal pattern, vocal or facial characteristics have all been used to identify a current user. These techniques are more effective in identifying a current user because a current user simply cannot loan his personal biometrics signatures to a borrowing user. The drawback with these biometrics techniques is that they often require specialized hardware and are costly to implement.

SUMMARY

The invention, in one aspect, features a method for authenticating the usage of an application. The method includes receiving, from a user device, a request to execute an application. The method also includes executing the application based on the request. The method also includes receiving, from the user device, an application-level usage indicator, wherein the application-level usage indicator corresponds to current operation of the application by a user and comprises at least (i) user input commands and (ii) passive usage metrics. The method also includes determining the identity of the user by comparing the application-level usage indicator with a pre-established user profile wherein the user profile is associated with previous operation of the application by the user and comprises at least (i) user input commands and (ii) passive usage metrics. The method also includes terminating, at the user device, execution of the application if the identified user is not entitled to use the application according to the user profile.

The invention, in another aspect, features a system for authenticating the usage of an application. The system includes an application execution module of a computing device. The application execution module is configured to receive, from a user device, a request to execute an application. The application execution module is also configured to execute the application based on the request. The application execution module is also configured to receive, from the user device, an application-level usage indicator, wherein the application-level usage indicator corresponds to current operation of the application by a user and comprises at least (i) user input commands and (ii) passive usage metrics. The application execution module is also configured to determine the identity of the user by comparing the application-level usage indicator with a pre-established user profile wherein the user profile is associated with previous operation of the application by the user and comprises at least (i) user input commands and (ii) passive usage metrics. The application execution module is also configured to terminate, at the user device, execution of the application if the identified user is not entitled to use the application according to the user profile.

The invention, in another aspect, features a system for authenticating the usage of an application. The system includes means for receiving, from a user device, a request to execute an application. The system also includes means for executing the application based on the request. The system also includes means for receiving, from the user device, an application-level usage indicator, wherein the application-level usage indicator corresponds to current operation of the application by a user and comprises at least (i) user input commands and (ii) passive usage metrics. The system also includes means for determining the identity of the user by comparing the application-level usage indicator with a pre-established user profile wherein the user profile is associated with previous operation of the application by the user and comprises at least (i) user input commands and (ii) passive usage metrics. The system also includes means for terminating, at the user device, execution of the application if the identified user is not entitled to use the application according to the user profile.

The invention, in another aspect, features a computer program product, tangibly embodied in a computer-readable storage medium, for authenticating the usage of an application. The computer program product includes instructions executable to cause a data processing apparatus to receive, from a user device, a request to execute an application. The computer program product also includes instructions executable to cause a data processing apparatus to execute the application based on the request. The computer program product also includes instructions executable to cause a data processing apparatus to receive, from the user device, an application-level usage indicator, wherein the application-level usage indicator corresponds to current operation of the application by a user and comprises at least (i) user input commands and (ii) passive usage metrics. The computer program product also includes instructions executable to cause a data processing apparatus to determine the identity of the user by comparing the application-level usage indicator with a pre-established user profile wherein the user profile is associated with previous operation of the application by the user and comprises at least (i) user input commands and (ii) passive usage metrics. The computer program product also includes instructions executable to terminate, at the user device, execution of the application if the identified user is not entitled to use the application according to the user profile.

The invention, in another aspect, features a system for authenticating the usage of an application. The system includes a computing device comprising a processor capable of executing an instruction sequence, a user interface capable of receiving user input and displaying information to a user, and a memory module capable of storing an instruction sequence. The system also includes one or more instruction sequences stored in the memory module. The one or more instruction sequences include an executable application that, when executed by the processor, minimally causes the processor to perform an application function according to a user input received by the user interface. The one or more instruction sequences also include an application-level usage monitor that, when executed by the processor, minimally causes the processor to create an application-level usage indicator according to the user input received by the processor via the user interface as the processor executes the executable application. The one or more instruction sequences also include a task manager that, when executed by the processor, minimally causes the processor to determine a current user according to a user profile stored in the memory and according to the application-level usage indicator, wherein the task manager further minimally causes the processor to terminate execution of the executable application when the determined current user is not entitled to use the executable application.

In some embodiments, any of the above aspects can include one or more of the following features. In some embodiments, receiving an application-level usage indicator includes receiving an email application usage indicator including at least one of an email client password, a mail recipient indicator, and a mail sender indicator. In some embodiments, receiving an application-level usage indicator includes receiving an content presentation application usage indicator including at least one of an access password, a content file-open indicator, a presentation time indicator, and a content navigation indicator.

In some embodiments, receiving an application-level usage indicator comprises receiving a word processing application usage indicator including at least one of a document navigation indicator, a document file-open indicator, and a document file-save indicator. In some embodiments, receiving an application-level usage indicator comprises receiving a web browser application usage indicator including at least one of a web-page address indicator, and a web-page dwell indicator.

In some embodiments, terminating execution of the application includes determining a user identity confidence level based on the comparison of the application-level usage indicator with the pre-established user profile, and terminating execution of the application if the identified user is not entitled to use the application based on the user profile and if the user identity confidence level fails to meet a minimum confidence level for the application. In some embodiments, terminating execution of the application includes determining a user identity confidence level based on the comparison of the application-level usage indicator with the pre-established user profile, and requesting additional identity information from the user if the user identity confidence level fails to meet a minimum confidence level for the application.

In some embodiments, requesting additional identity information from the user includes requesting the user to execute a second application, receiving an application-level usage indicator corresponding to current operation of the second application by the user and comprising at least (i) user input commands and (ii) passive usage metrics, and refining the determination of the identity of the user by comparing the application-level usage indicator corresponding to current operation of the second application by the user with a pre-established user profile, wherein the user profile is associated with previous operation of the second application by the user and comprises at least (i) user input commands and (ii) passive usage metrics.

In some embodiments, requesting additional identity information from the user includes requesting the user to execute a password-protected second application, receiving a password from the user upon executing the second application, and refining the determination of the identity of the user by comparing the received password with a pre-established user profile, wherein the user profile is associated with previous operation of the second application and comprises at least a predefined password. In some embodiments, a user profile is created based on one or more application-level usage indicators received from the user device during a registration period of the application. In some embodiments, a user is identified through a login process if a predominate user of the application has not yet been determined, an application-level usage indicator corresponding to current operation of the application by a user and comprising at least (i) user input commands and (ii) passive usage metrics is received from the user device, a user profile is created for the identified user based on the application-level usage indicator corresponding to the current operation of the application by the user, and the identified user is determined to be the predominate user when the user profile meets a minimum confidence level for the application.

In some embodiments, the passive usage metrics can include a length of time that the application has been executing, a length of time that the application has displayed a particular piece of content, a timestamp that the application was executed, or any combination thereof. In some embodiments, the executable application includes an email client and the application-level usage monitor causes the processor to create an application-level usage indicator by minimally causing the processor to create a usage indicator according to at least one of an e-mail password, a mail recipient for an email sent to a server by the e-mail client and a mail sender for an e-mail received by the e-mail client from a server.

In some embodiments, the executable application includes a content presentation application and the application-level usage monitor causes the processor to create an application-level usage indicator by minimally causing the processor to create a usage indicator according to at least one of a password, a content file-open command, a content navigation command, a play command and a stop-play command. In some embodiments, the executable application includes a word processor and the application-level usage monitor causes the processor to create an application-level usage indicator by minimally causing the processor to create a usage indicator according to at least one of a password, a document file-open command, a navigation command, and a document file-save command.

In some embodiments, there is a network interface capable of receiving a request web page and the executable application includes a web browser and wherein the application-level usage monitor causes the processor to create an application-level usage indicator by minimally causing the processor to create a usage indicator according to at least one of a web-page address included in a web-page request directed to the network interface and an amount of time between consecutive web-page requests.

In some embodiments, the task manager causes the processor to determine a current user and also terminate execution of the executable application by minimally causing the processor to establish a confidence level for a current user determination, determine a confidence threshold for the executable application, and terminate the execution of the executable application when the confidence level for the current user determination fails to meet the confidence threshold for the executable application. In some embodiments, the task manager causes the processor to determine a current user and also terminate execution of the executable application by minimally causing the processor to establish a confidence level for a current user determination, determine a confidence threshold for the executable application, verify the identity of the current user when the confidence level for the current user determination fails to meet the confidence threshold for the executable application, and terminate the execution of the executable application when the verified user is not entitled to use the executable application.

In some embodiments, the task manager causes the processor to verify the identity of a current user by minimally causing the processor to direct to the user interface a request for the user to execute a second application, receive an application-level usage indicator from the usage monitor, and refine a current user determination according to the received application-level usage indicator. In some embodiments, the task manager causes the processor to verify the identity of a current user by minimally causing the processor to direct to the user interface a request for the user to execute a password protected application, receive a password indicator from the usage monitor, and refine a current user determination according to the received password.

In some embodiments, a user profile generator instruction sequence is stored in the memory and, when executed by the processor, the user profile generator instruction sequence minimally causes the processor to generate a user profile according to application-level usage indicators received from the usage monitor during a registration period. In some embodiments, the user profile generator instruction sequence minimally causes the processor to generate a user profile by minimally causing the processor to direct a login screen to the user interface, receive a user identifier and password from the login screen, receive one or more application-level usage indicators from the usage monitor, create a user profile for the user identifier and the update the user profile according to the one or more application-level usage indicators, and identify the user identifier as a predominate user when the user profile meets a minimum confidence level.

BRIEF DESCRIPTION OF THE DRAWINGS

Several alternative embodiments will hereinafter be described in conjunction with the appended drawings and figures, wherein like numerals denote like elements, and in which:

FIG. 13 is a pictorial diagram of one example embodiment of an application/content allowance table.

DETAILED DESCRIPTION

Figure 1:
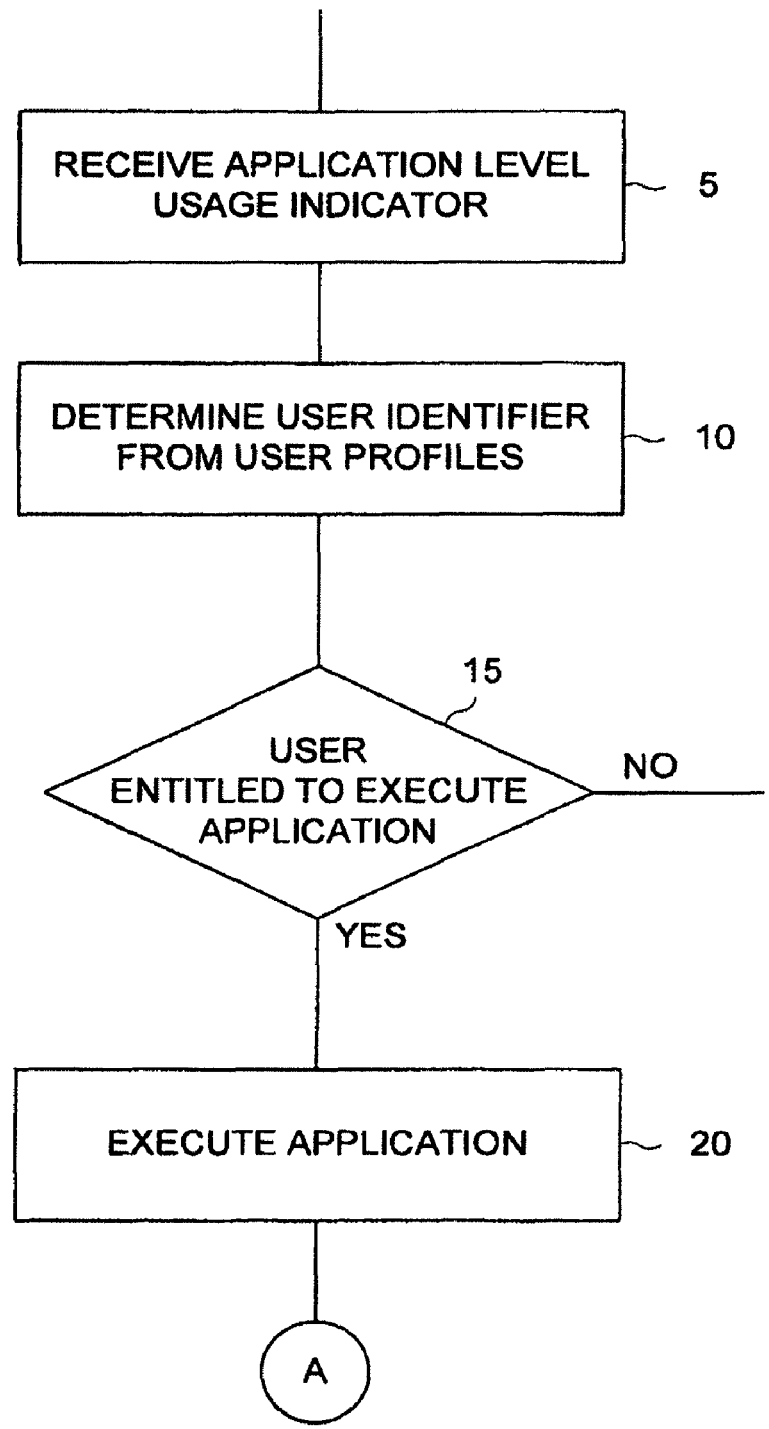
FIG. 1 is a flow diagram that depicts one example method for authenticating usage of an application.

FIG. 1 is a flow diagram that depicts one example method for authenticating usage of an application. According to this example method, execution of an application is authenticated by receiving an application-level usage indicator (step 5). A user identifier is then determined based on one or more user profiles, which are consulted using the received application-level usage indicator (step 10). The application is executed (step 20) when the determined user identifier is associated with a user that is entitled to use the application (step 15).

At any given time, an execution platform, which according to one alternative method comprises at least one of a computer and a media playback device, records application-level usage of at least one of an application installed on the device and content which is accessible by one of the applications so installed on the device. In order to further appreciate one illustrative variation of the present method, one example of application-level recording includes the manner in which e-mail is utilized by a user. The fact that a user first uses e-mail, then surfs certain websites and then edits a particular document are additional examples of how application-level usage indicators can be recorded. It should be appreciated that these are merely examples presented here to illustrate one variation of the present method and are not intended to limit the scope of the claims appended hereto. It should also be appreciated that application-level usage includes any application usage information that can be used to create a usage pattern for a particular user.

In the following, it is assumed that an association has previously been created between certain applications, content, and certain users. A "predominant user" of an execution platform, according to one variation of the present method, is inferred from patterns of use commensurate with the teaching set forth herein. As such, a certain user (e.g. a predominate user) is declared to be the rightful user of an application installed on the execution platform and any content that can be accessed using the execution platform. Complex usage patterns are considered the best indicator of the predominant user. It should be appreciated that manner in which a user uses any one or any combination of an e-mail client, a word processor, a web browser and a content presentation application contributes to an individualistic pattern of use. In one variation of the present method, usage data from a plurality of user sessions are averaged in order to establish a user profile.

Figure 2:
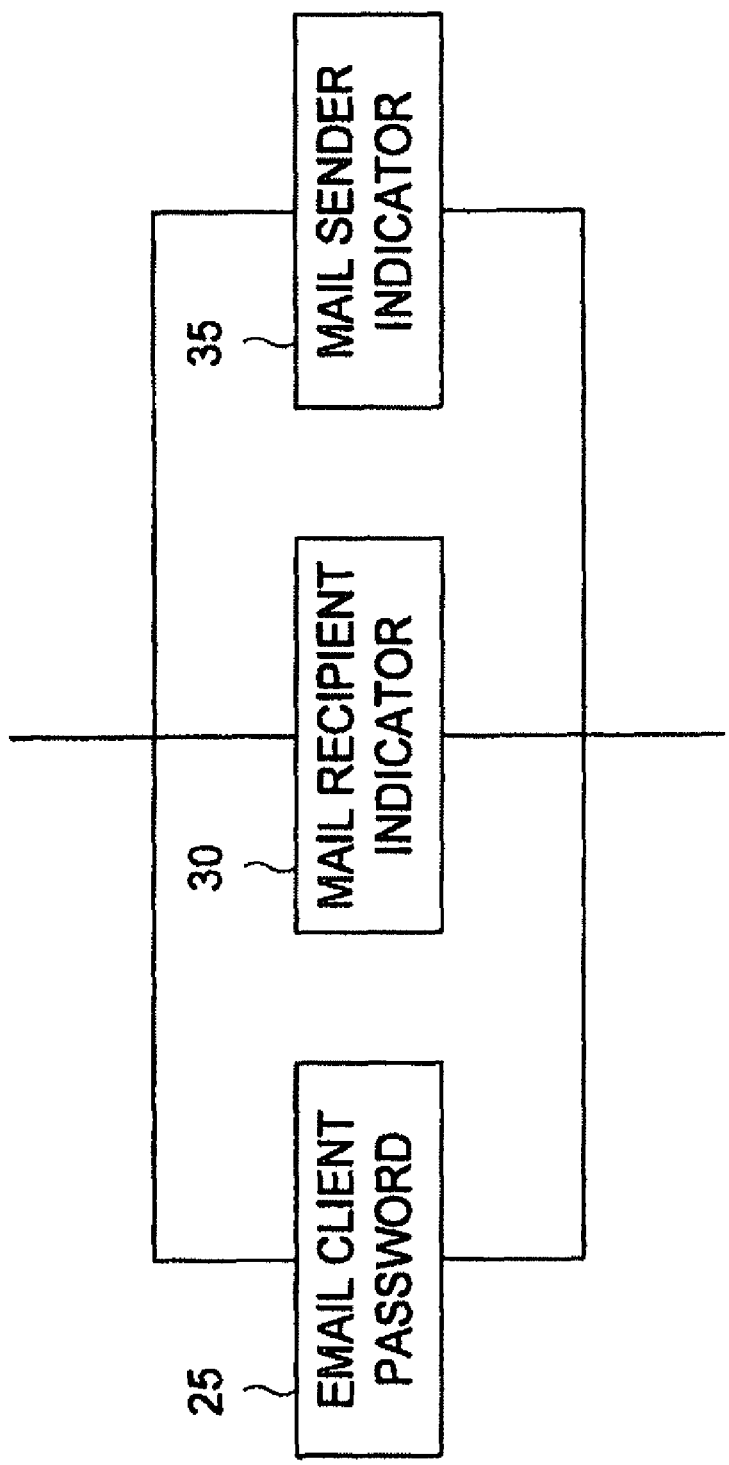
FIG. 2 is a flow diagram that depicts alternative example methods for receiving an application-level usage indicator that reflects the usage of an e-mail client.

FIG. 2 is a flow diagram that depicts alternative example methods for receiving an application-level usage indicator that reflects the usage of an e-mail client. According to one alternative illustrative method, a usage indicator is received by receiving an e-mail client password (step 25). It should be appreciated that when the particular user begins using an e-mail client, the e-mail client may in fact request a password. It should further be appreciated that in this situation, a user that owns a particular execution platform may be less likely to share an e-mail password with a different person, i.e., a person that is borrowing an execution platform from the owner of that execution platform. In yet another alternative example method, an application-level usage indicator is received by receiving an e-mail recipient indicator (step 30). According to this variation of the present method, the owner of the execution platform may use an e-mail client to send an e-mail to a particular individual. Again, it is not likely that a borrowing user will send an e-mail to that same particular individual. This type of application-level usage indicator, according to this variation of the present method, is used to create a profile for a user. Typically, this profile is created for a user that is the owner of the execution platform. According to yet another alternative example method, an application-level indicator of usage is received by receiving an e-mail center indicator (step 35). Again, it is unlikely that a borrowing user will receive an e-mail from any particular individual by using an e-mail client that is installed on an execution platform that is owned by a different person.

Figure 3:
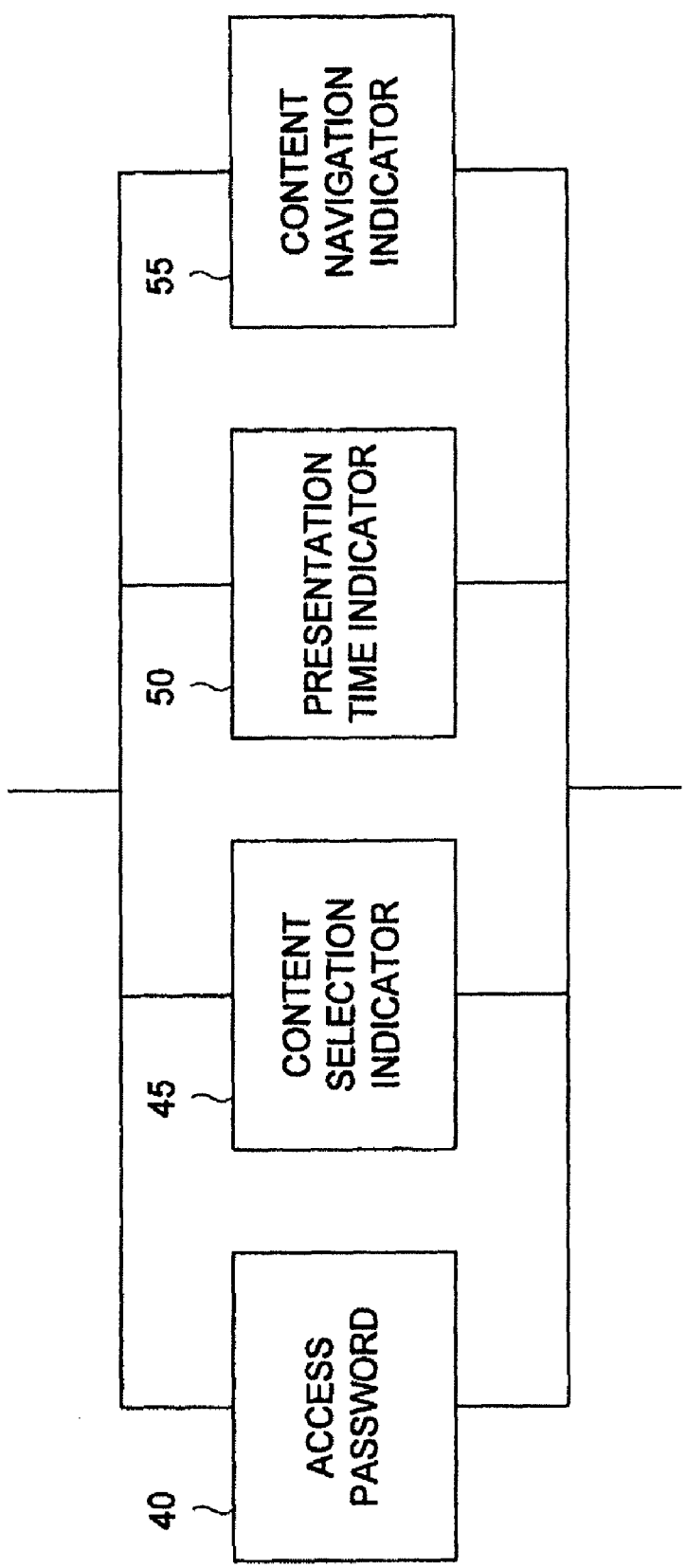
FIG. 3 is a flow diagram that depicts alternative example methods for receiving an application-level usage indicator where in the application-level usage indicator reflects usage of a content presentation application.

FIG. 3 is a flow diagram that depicts alternative example methods for receiving an application-level usage indicator wherein the application-level usage indicator reflects usage of a content presentation application. It should be appreciated that according to one variation of the present method, an application-level usage indicator is received by receiving an access password (step 40) from a content presentation application. In this illustrative variation of the present method, a borrowing user may not necessarily be given a password for a particular content presentation application. For example, the owner of an execution platform may not give a borrowing user a password to view video content. For example, the owner of an execution platform may only give a borrowing user a password for audio content presentation. In yet another variation of the present method, an application-level usage indicator is received by receiving a content selection indicator (step 45). A content selection indicator typically reflects the selection of a particular content file by a user that is using a content presentation application. In this situation, even though a borrowing user may be given a password to a content presentation application, the manner in which the borrowing user accesses a particular content file may be inconsistent with the mannerisms of the owner of an execution platform as that owner views particular content using the content presentation application.

In yet another alternative example method, an application-level usage indicator is received by receiving a presentation-time indicator. A presentation-time indicator, according to this illustrative variation of the present method, is used to create a signature for a current user. This can also be used to determine whether or not a current user is in fact the owner of an execution platform or merely a borrower thereof. Again, the owner of an execution platform may in fact have a particular presentation signature, for example the owner of the execution platform may only watch 20 minutes of a particular content file a particular time. In yet another variation of the present method, an application-level usage indicator is received by receiving a content navigation indicator. Again, a particular user may navigate through a particular content file in a certain manner. This type of application-level usage, according to this variation of the present method, is used to determine a current user.

Figure 4:
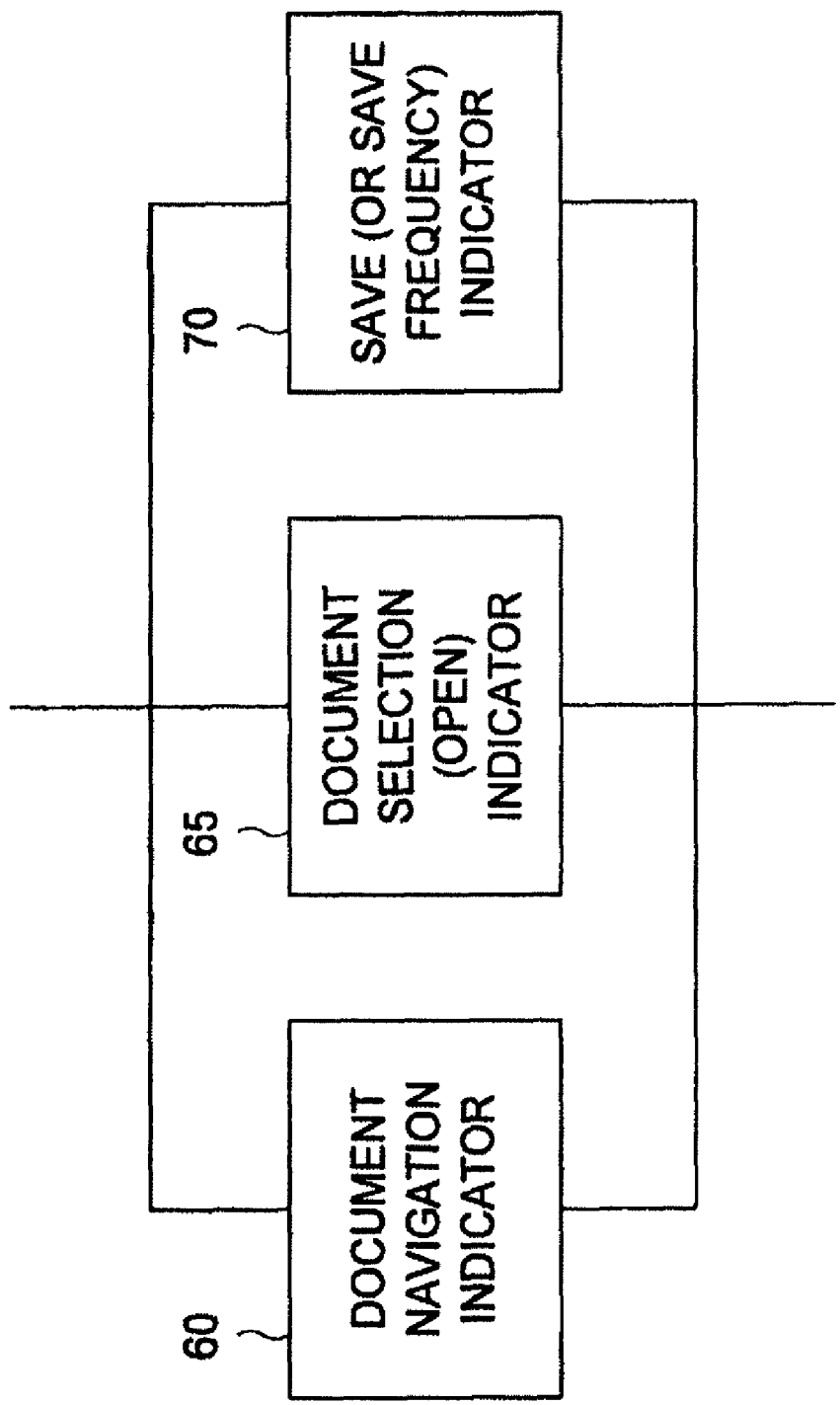
FIG. 4 is a flow diagram that depicts alternative example methods for receiving an application-level usage indicator which reflects the usage of a word processing application.

FIG. 4 is a flow diagram that depicts alternative example methods for receiving an application-level usage indicator which reflects the usage of a word processing application. According to one alternative example method, an application-level usage indicator is received by receiving a document navigation indicator. According to this example method, a user is determined by monitoring navigation indicators including but not limited to: scroll commands and text selections. Such navigation indicators, according to this variation of the present method, are used to determine a current user. In yet another variation of the present method, a document selection indicator (e.g. in indicator that indicates that a user has opened a particular file) is used as an application-level usage indicator (step 65). In this situation, a borrowing user may not necessarily open the same files as the user who owns a particular execution platform might otherwise open using a word processor. In yet another variation of the present method, a document saves indicator (step 70) is received as an application-level usage indicator. In this variation the present method, the frequency with which the particular user saves a documents is used to determine a current user.

Figure 5:
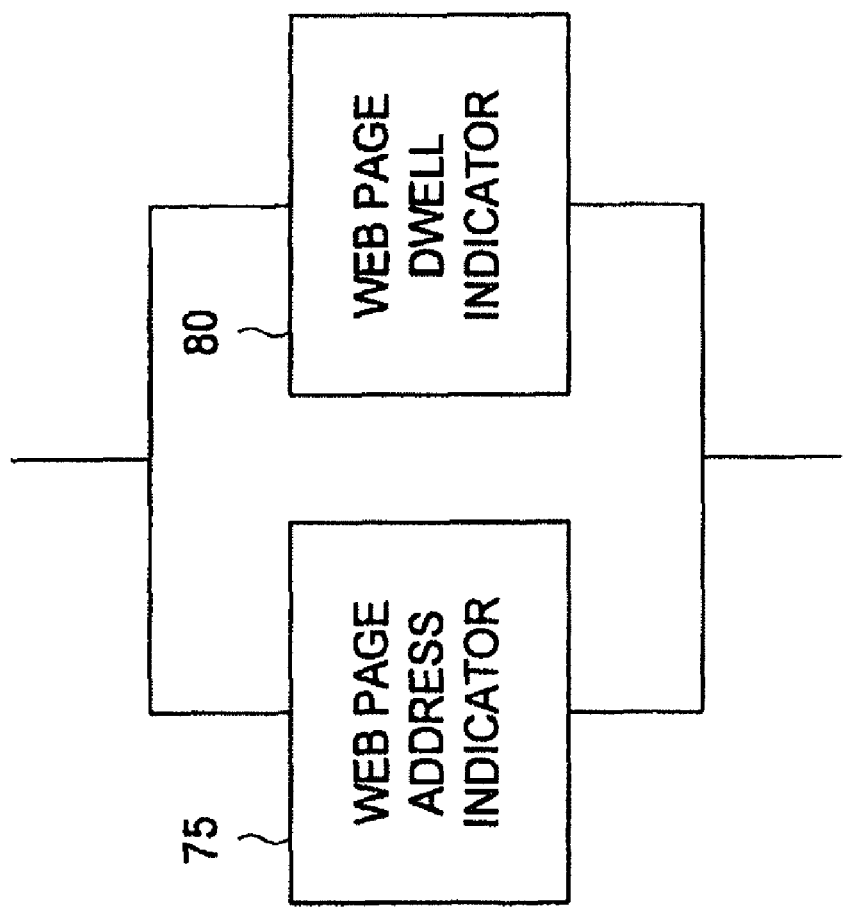
FIG. 5 is a flow diagram that depicts alternative example methods for receiving an application-level usage indicator that reflects the usage of a web browser.

FIG. 5 is a flow diagram that depicts alternative example methods for receiving an application-level usage indicator that reflects the usage of a web browser. According to one alternative example, receiving an application-level usage indicator comprises receiving a web page address indicator (step 75). Again, a particular user may frequent one or more web pages that may be different than the webpages that a second user frequents. As such, a web page address indicator, according to this variation of the present method, is used in determining a current user. In yet another alternative variation of the present method, a web page dwell indicator is received (step 80) as an application-level usage indicator. It should be appreciated that a particular user may view a particular web page for a particular length of time. As such, a web page dwell indicator is used to determine a current user. It should also be appreciated that the amount of time a particular user views a particular web page can also be determined, according to yet another variation of the present method, by determining the amount of time elapsed before the receipt of a second web-page address indicator after the first web-page address indicator is received.

Figure 6:
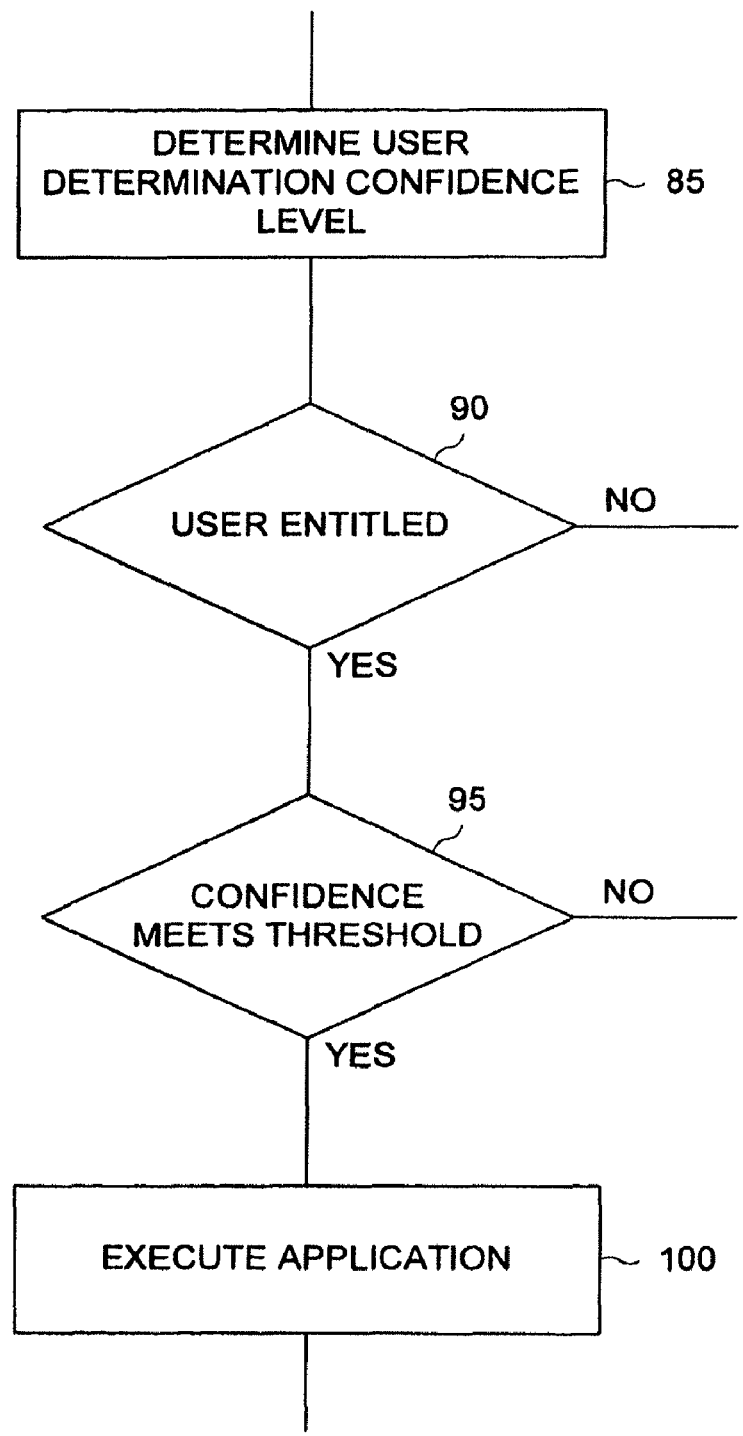
FIG. 6 is a flow diagram that depicts one alternative example method for enabling execution of an application.

FIG. 6 is a flow diagram that depicts one alternative example method for enabling execution of an application. According to this alternative example method, an application is executed by determining a user determination confidence level (step 85). When the current user of an execution platform is entitled to use a particular application (step 90) and confidence in a particular user determination meets a pre-established threshold (step 95), the application is executed (step 100). It should likewise be appreciated that access to a particular mutual content, according to yet another variation of the present method, is protected in a like manner. It should be appreciated that various types of applications may be associated with varying degrees of confidence in a particular user determination. Accordingly, one variation of the present method relies on a concept called "acceptable tolerance", which is application dependent. It should also be appreciated that an acceptable tolerance may be specified as a lower-limit or an upper-limit, again depending on a particular application (or a particular type of content). For example, in a situation where misuse or piracy is a serious problem, a very close match may be required to grant access. This may be the acceptable means of applying the present method where a particular content is thought to have very high value on the "black market". On the other hand, a weaker match may be deemed acceptable for information which is quasi-public already, such as the results of a particular search which, although requiring a fee to obtain, are not likely to be of tremendous value to the market in general.

If, on the other hand, the usage patterns do not match those of a predominant user, then the execution platform has discovered a non-predominant or new user. This, in itself, may not pose a problem, unless this "other" user is preliminarily determined to be trying to use applications or access content that has already been associated by the device with a predominant user (and which is/are known by the device to have access rights that prohibit use by "others"). In such a case, various actions may be taken by the device, such as simply blocking access to those applications/that content previously associated with a predominant user. However, in such a case where the device "assumes" that the current user is not authorized, but the verification of that user does not have a high confidence level (for example, due to the fact that an insufficient amount of data has been gathered to confidently identify the current and/or predominant user), the device can decide to defer any actions toward blocking access to applications/content until such time as it is more confident of the current user's association (or lack thereof) with certain content/applications. The chosen actions are application dependent; the tradeoff to be considered is balancing the risks of granting access versus the risks of denying access. For example, the content owner may decide to block access to pornographic content, since the liability of granting access to an unauthorized user could be high, whereas the liability for blocking access to that content is probably not significant. On the other hand, blocking access by a "probably but not confirmed as authorized" user to a pay-per-view event which will never be repeated may be perceived to entail more potential liability than granting access, even though the identity of the current user has not yet been established to be within a normally acceptable confidence level.

Figure 7:
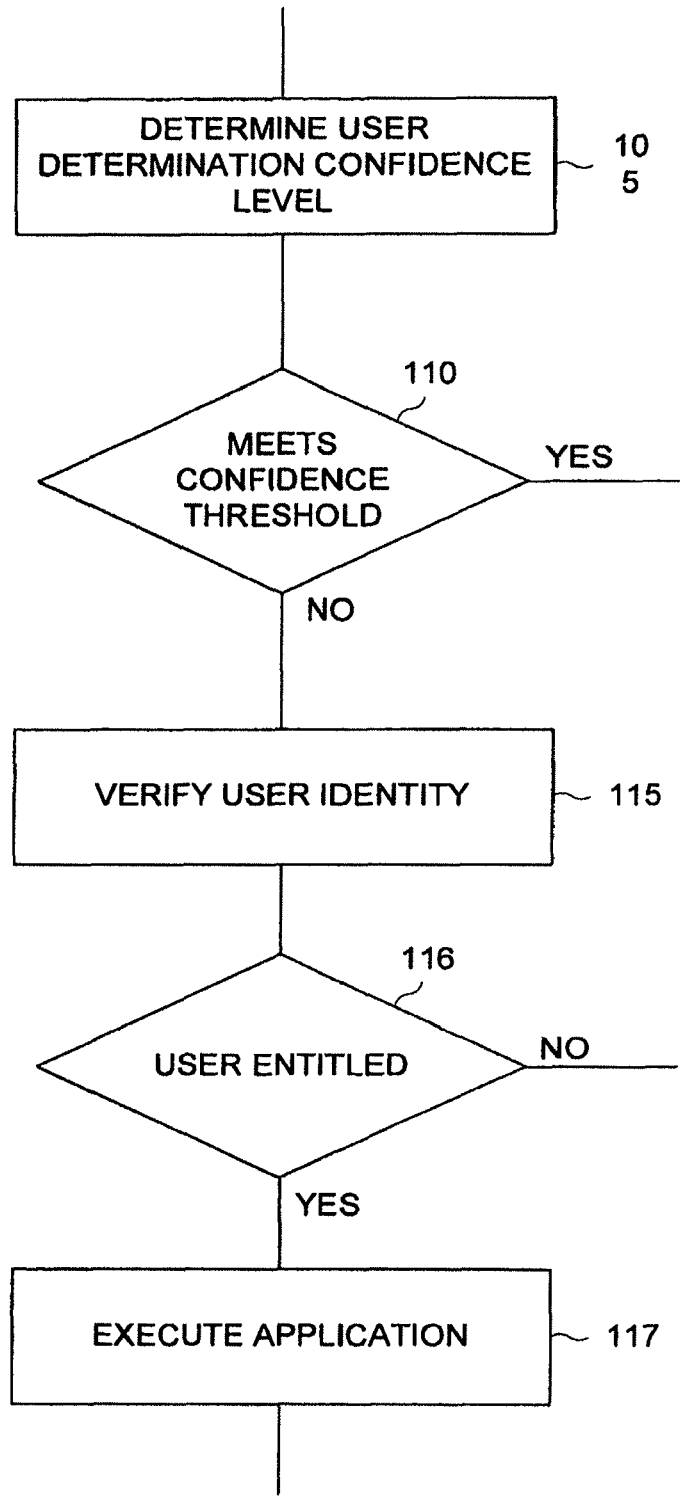
FIG. 7 is a flow diagram that depicts alternative method for enabling execution of an application when a user determination fails to meet the minimum confidence level.

FIG. 7 is a flow diagram that depicts an alternative method for enabling execution of an application when a user determination fails to meet the minimum confidence level. It should be appreciated that a rightful user of an application or a user that rightfully has permission to access the particular content may become annoyed when such access is curtailed. Accordingly, in a situation where the user determination (step 105) fails to meet a minimum confidence threshold (step 110), the identity of a user is verified (step 115). Once a user identity is verified (step 116), the application is that executed (step 117), or the user, is allowed to access a particular content selection.

Figure 8:
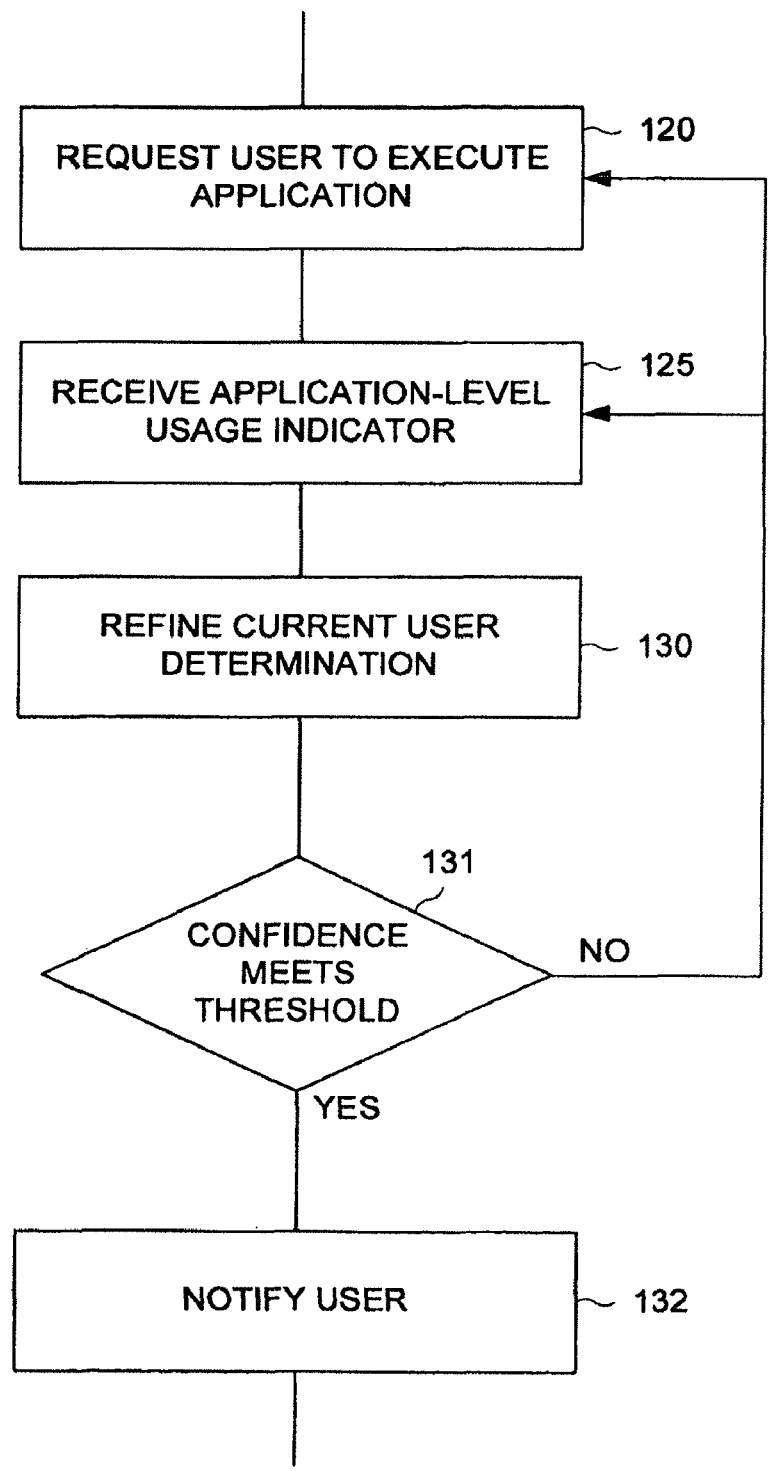
FIG. 8 is a flow diagram that depicts an alternative method for verifying the identity of a current user.

FIG. 8 is a flow diagram that depicts alternative method for verifying the identity of a current user. According to this variation of the present method, the identity of a current user is verified by requesting a user to execute a particular application (step 120) which is installed on an execution platform. An application-level usage indicator is received (step 125) as the user uses the application that they have been requested to execute. A current user determination is then refined (step 130) according to the received application-level usage indicator. It should be appreciated that the amount of time necessary for a particular user to use a particular application may vary. Accordingly, so long as the confidence in a user determination fails to meet a particular threshold, additional application-level usage indicators are received and the current user determination is refined according thereto. Once the confidence threshold is met (step 131) the user is notified (step 132) that the user can discontinue use of the application which he user was requested to use. In the event that the user determination threshold is not met as the user executes a particular application, the user may be asked to execute a different application.

Figure 9:
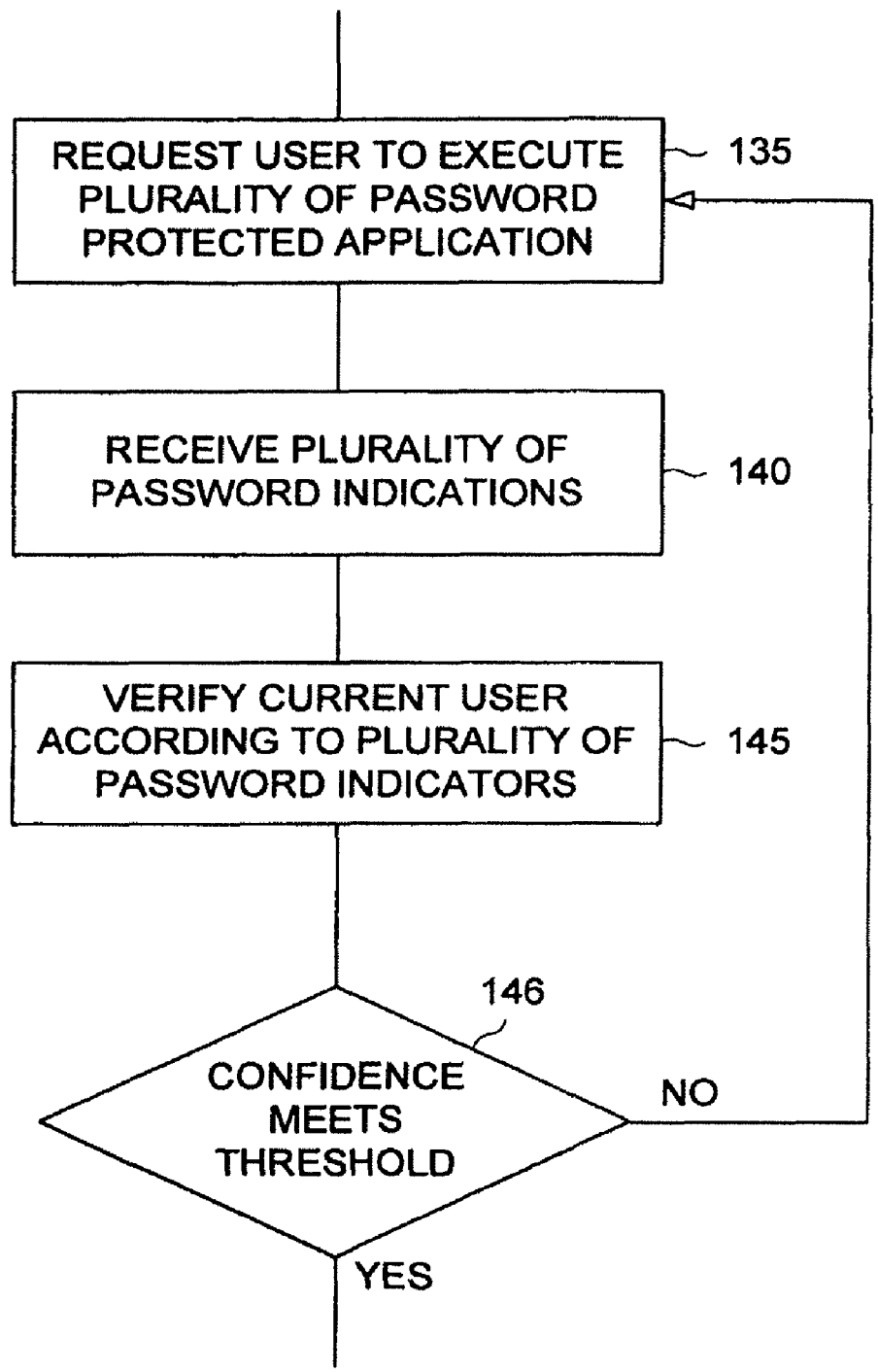
FIG. 9 is a flow diagram that depicts yet another alternative method for verifying the identity of a current user.

FIG. 9 is a flow diagram that depicts yet another alternative method for verifying the identity of a current user. According to this variation of the present method, the identity of a current user is verified by requesting a user to execute a particular application that is password protected (step 135) and which is installed on an execution platform. An application-level usage indicator is then received in the form of a password for the application (step 125) that the user has been requested to execute. Again, it is not likely that a user that owns a particular execution platform will share all of their passwords for different applications with a second user (i.e. a borrowing user). A current user determination is then refined (step 130) according to the received password. It should be appreciated that the number of passwords needed to refine a current user determination may vary. Accordingly, so long as the confidence in a user determination fails to meet a particular threshold, additional passwords are received as the user is asked to execute additional applications. The current user determination is refined according passwords received in this manner. Once the confidence threshold is met (step 131) the user is no longer required to execute additional password protected applications.

Figure 10:
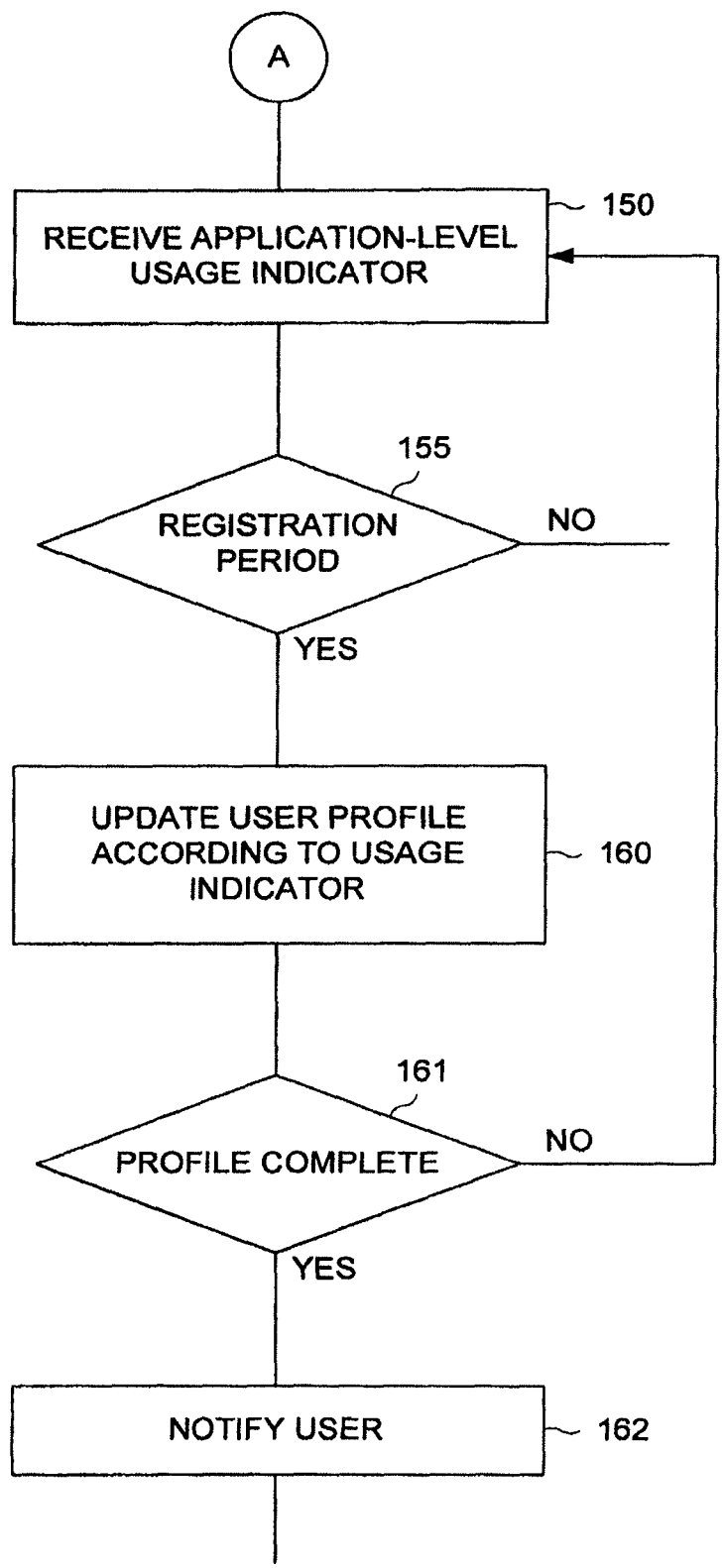
FIG. 10 is a flow diagram that depicts one variation of the present method for creating a user profile.

FIG. 10 is a flow diagram that depicts one variation of the present method for creating a user profile. According to this variation of the present method, an application-level usage indicator is received (step 150). So long as an execution platform has not identified a predominant user, the execution platform remains in a registration period mode. During a registration period (step 155), a user profile is updated according to a received application-level usage indicator (step 160). It should be appreciated that a plurality of such application-level usage indicators will be accumulated during a registration period in order to create a user profile. Accordingly, the execution platform will create a profile for a predominant user in this matter. It should likewise be appreciated that, during this registration period, the owner of an execution platform should refrain from loaning the device to another user. Once a profile has been completed (step 161), the user is notified (step 162). Once the user has received this notification, the user can then loan the device to another user should the user so desire.

Figure 11:
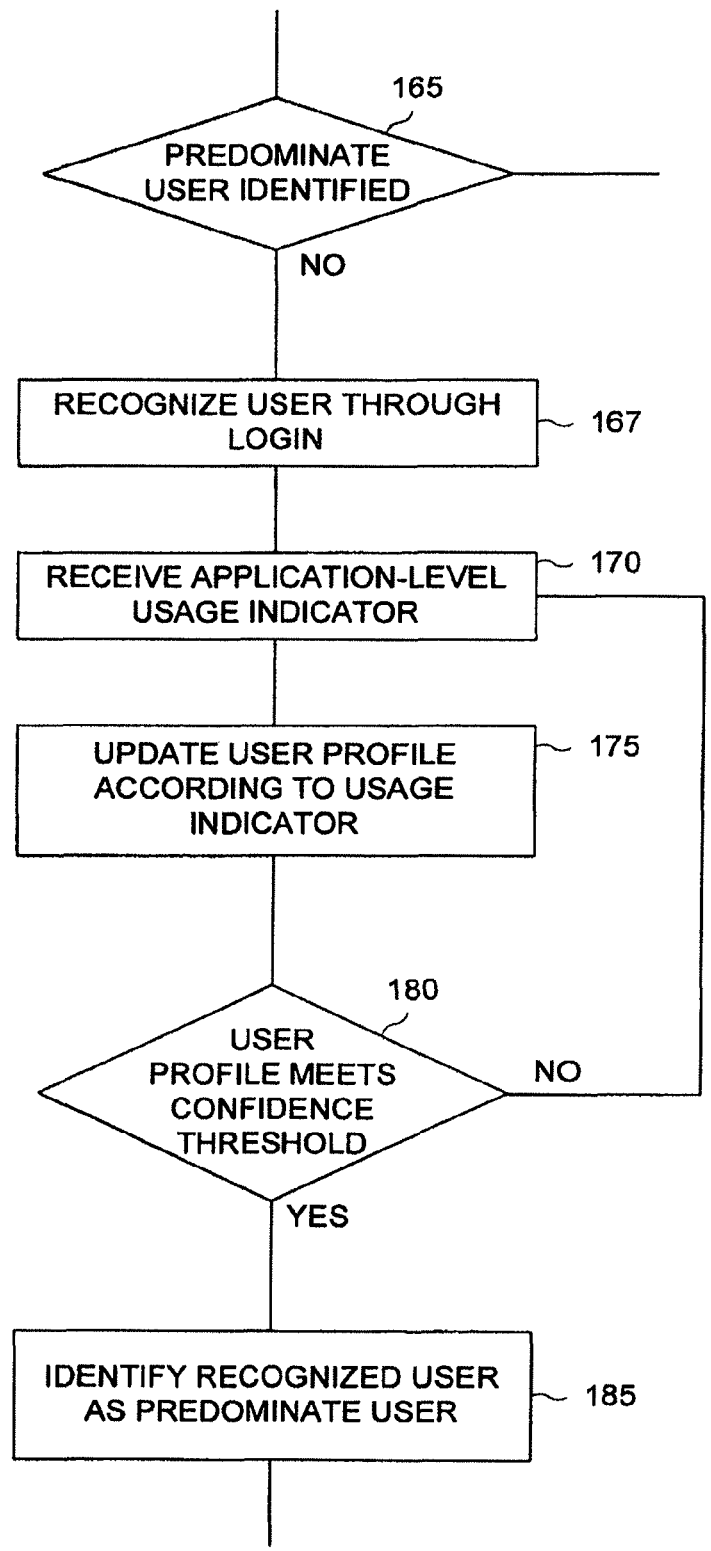
FIG. 11 is a flow diagram that depicts alternative method for creating a user profile.

FIG. 11 is a flow diagram that depicts alternative method for creating a user profile. According to this variation of the present method, a profile for a predominant user is created by first determining whether or not a predominant user has been identified (step 165). In the event that a predominant user has not been identified, a user is recognized through a login process (step 167). An application-level usage indicator is received (step 170) and a user profile is updated according to the received application-level usage indicator (step 175). It should be appreciated that the profile is associated with a user which has been identified through the login process. Once a user profile meets a minimum confidence threshold (step 180), the identity of the recognized user (i.e., the user recognized through the login process) is identified as a predominant user and associated with a newly created user profile (step 185). So long as the user profile has not met the confidence threshold, additional application-level usage indicators are received and are used to update the user profile.

Figure 12:
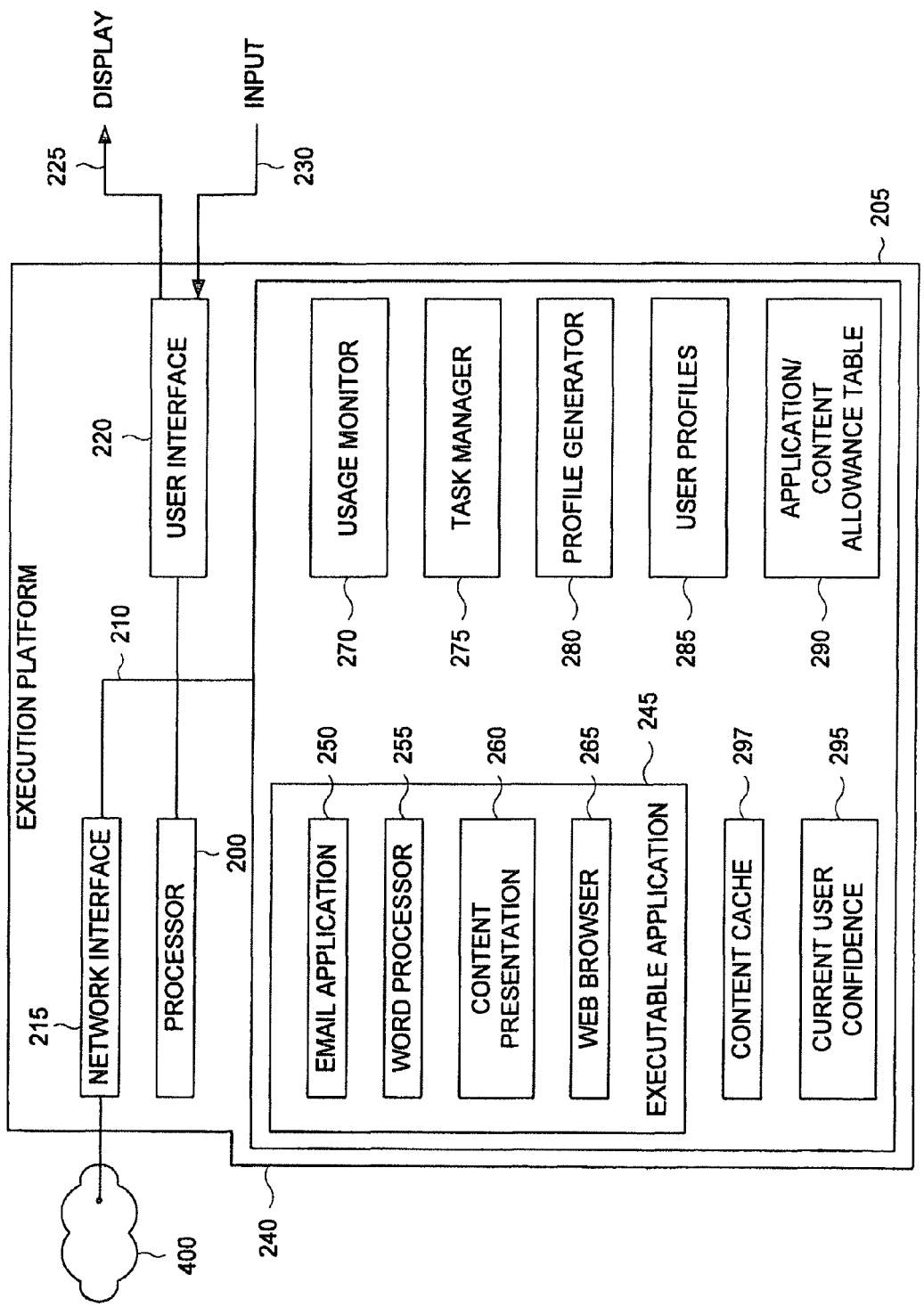
FIG. 12 is a block diagram that depicts one alternative embodiment of an application execution platform capable of authenticating the usage of an application according to the present method.

FIG. 12 is a block diagram that depicts one alternative embodiment of an application execution platform capable of authenticating the usage of an application according to the present method. According to this alternative embodiment, an execution platform 205 comprises one or more processors 200, a memory 240, and a network interface 215. Also included in this illustrative embodiment is a user interface 220, which is capable of enabling the processor 200 to direct information 225 to and receive instructions 230 from a user. Also included in this alternative embodiment of an execution platform 205 are one or more functional modules. A functional module is typically embodied as an instruction sequence that is stored in the memory 240.

An instruction sequence that implements a functional module, according to one alternative embodiment, is stored in the memory 240. The reader is advised that the term "minimally causes the processor" and variants thereof is intended to serve as an open-ended enumeration of functions performed by the processor 200 as it executes a particular functional module (i.e. instruction sequence). As such, an embodiment where a particular functional module causes the processor 200 to perform functions in addition to those defined in the appended claims is to be included in the scope of the claims appended hereto.

The functional modules (and their corresponding instruction sequences) described herein that enable authenticated execution of an application according to the present method are, according to one alternative embodiment, imparted onto computer readable media. Examples of such media include, but are not limited to, random access memory, read-only memory (ROM), compact disk ROM (CD ROM), floppy disks, hard disk drives, magnetic tape and digital versatile disks (DVD). Such computer readable media, which alone or in combination can constitute a stand-alone product, can be used to convert at least one of a general-purpose computing platform into an execution platform capable of authenticating execution of an application according to the techniques and teachings presented herein. Accordingly, the claims appended hereto are to include such computer readable media imparted with such instruction sequences that enable execution of the present method and all of the teachings herein described.

According to this example embodiment, an execution platform 205 comprises an executable application 245, an application-level usage monitor 270 and a task manager 275. It should be appreciated that each of these are embodied as instruction sequences that are stored in the memory 240. According to one alternative example embodiment, the executable application 245 comprises an electronic mail application 250. In yet another alternative example embodiment, the executable application 245 comprises a word processor 255. In yet another alternative example embodiment, the executable application 245 comprises a content presentation application 260. In yet another example alternative embodiment, the executable application comprises a Web browser application 265. In one alternative example embodiment, there is also included in the memory 240 a profile generator 280. The profile generator 280 interacts with a collection of one or more user profiles 285 which are also stored in the memory 240. The user profiles 285 or using conjunction with an application/content allows table 290. The application/content allows table 290 is also stored in the memory 240. According to one alternative example embodiment, the memory 240 is also used to store content in a content cache 297. The task manager 275, according to this example embodiment, minimally causes the processor to determine the current user, which is stored in a current user/confidence variable 295 maintained in the memory 240.

FIG. 13 is a pictorial diagram of one example embodiment of an application/content allowance table. According to this example embodiment, an application/content allowance table 300 comprises one or more records, each record including at least one of an application/content identifier field 305, a minimum confidence level field 310 and an entitlement user identifier field 320. In one alternative embodiment, the application/content allows table 300 further includes an "err in favor" field 315. It should be appreciated that any example entries depicted in the figure are represented for purposes of illustration only, and are not intended to limit the scope of the claims appended hereto. For example, one entry in the application/content allowance table 300 may include an entry for a word processor. This entry may specify that a minimum confidence level of 10 percent needs to be achieved before allowing a word processor to be executed. As another example, a particular content identified as Music A will only be presented to a user upon a 40 percent confidence in user determination according to the present method. In yet another example, a content of video called Video A will likewise be presented to a user only when the minimum confidence level in determining the user reaches 40 percent. Again, these are merely examples of how the application/content allows table 300 may be used in one alternative example embodiment of an execution platform 205.

Figure 14:
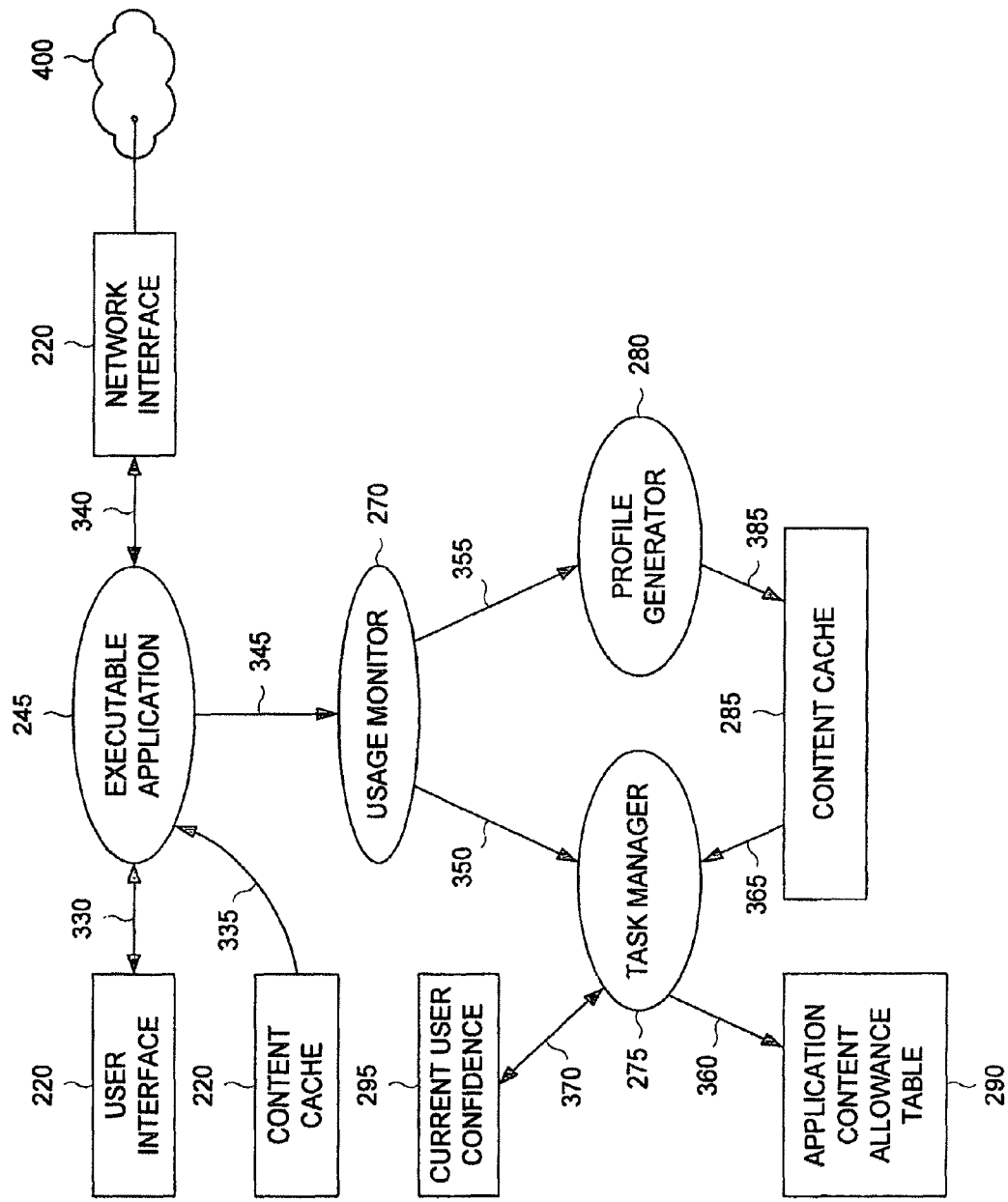
FIG. 14 of is a dataflow diagram that depicts the internal operation of several alternative example embodiments of an execution platform.

FIG. 14 is a dataflow diagram that depicts the internal operation of several alternative example embodiments of an execution platform. According to one alternative example embodiment, an executable application 245 is executed by the processor 200. As the executable application is executed by the processor, the executable application 245 minimally causes the processor to perform an application function. During the course of performing the application function, the executable application 245 minimally causes the processor to receive a user input 230 by means of the user interface 220. The executable application 245, according to one illustrative example embodiment, further minimally causes the processor to provide 345 an application-level user input to the usage monitor 270. The usage monitor 270, when executed by the processor 200, minimally causes the processor to generate an application-level usage indicator according to the user input 345 received from the executable application 245. The usage monitor 270 provides the application-level usage indicator to the task manager 350. The task manager 350 minimally causes the processor to determine the current user by consulting one or more user profiles 285 stored in the memory. Accordingly, the task manager 275 further minimally causes the processor to retrieve 365 one or more of such user profiles from the user profiles 285 stored in the memory. The application-level usage indicator is the used to select one of the user profiles. This results in the storage of a current user identifier 295 in the memory. Current user identifier 295, according to yet another alternative example embodiment, further includes a confidence indicator. The confidence indicator is adjusted by the processor 200 as the processor 200 continues to execute the task manager 275. The task manager 275, upon receiving additional application-level usage indicators 350 from the usage monitor or 70, will adjust the confidence indicator as the processor 200 continues to refine its estimate of a current user based on an accumulation of one or more application-level usage indicators and correlation of such application-level usage indicators with the one or more user profiles 285 stored in the memory.

It should be appreciated that, according to one alternative example embodiment, the executable application 245 comprises an e-mail client. In this situation, the e-mail client 250, when executed by the processor 200, minimally causes the processor 200 to provide various commands to the usage monitor 270. The usage monitor 270, when executed by the processor 200, minimally causes the processor to generate an application-level usage indicator according to at least one of an e-mail password received from the user by means of the user interface 220, a mail recipient for e-mail sent to a server by the e-mail client, and a mail sender for an e-mail received by the e-mail client from a server. Each of these various types of application-level usage indicators are provided 345 to the at least one of the task manager 275 and the profile generator 280.

It should also be appreciated that, according to yet another alternative example embodiment, the executable application comprises a content presentation application 260. In this alternative example embodiment, the content presentation application 260 provides various types of commands to the usage monitor 270. The usage monitor 270, when executed by the processor 200, generates an application-level usage indicator according to at least one of a password for accessing a particular content, a content file-open command, a content navigation command, a content play command and a content stock-play command. Each of these various types of application-level usage indicators are provided 345 to the at least one of the task manager 275 and the profile generator 280.

In yet another alternative example embodiment, the executable application comprises a word processor. In this case the word processor 255, when executed by the processor 200, minimally causes the processor 200 to provide 345 a user commands to the usage monitor 270. The usage monitor 270, when executed by the processor 200, further minimally causes the processor 200 to generate an application-level usage indicator according to at least one of a password access, a particular user file, a document file-open command, a document navigation command and a document file-safe command. Each of these various types of application-level usage indicators are provided 345 to the at least one of the task manager 275 and the profile generator 280.

In yet another example embodiment, the executable application comprises a Web browser 265. In this situation, the Web browser 265, when executed by the processor 200, further minimally causes the processor to provide 345 a user command to the usage monitor 270. According to this alternative example embodiment, the usage monitor 270 minimally causes the processor 200 to generate an application-level usage indicator according to a Web-page address included in a Web-page request which is directed to a network interface 215 included in one alternative example embodiment of an execution platform 205. In yet another alternative example embodiment, the usage monitor 270 minimally causes the processor 200 to generate an application-level usage indicator according to an amount of time between consecutive web page requests. Accordingly, the usage monitor 270 minimally causes the processor to receive consecutive Web-page addresses and to determine the amount of time between such consecutive Web-page addresses. Each of these various types of application-level usage indicators are provided 345 to the at least one of the task manager 275 and the profile generator 280.

FIG. 14 further illustrates that, according to yet another alternative example embodiment, the task manager 275, when executed by the processor 200, minimally causes the processor to establish a confidence level for a current user determination by adjusting 370 a confidence indicator stored in the current user confidence variable 295 stored in the memory. Once a confidence level for a current user determination is made, the task manager 275 consults the application content allowance table 290 in order to determine a minimum confidence threshold for a particular application or content. As such, the application/content allows table 290 is consulted by retrieving 370 from the minimum confidence level field 310 a minimum confidence level for a particular application or content. A comparison is then made with the minimum confidence level retrieved from the application/content allowance table to the confidence level for a current user determination stored in the current user confidence variable 295. The task manager 275 in this alternative example embodiment further minimally causes the processor 200 to terminate the execution of an executable application 245 when a confidence level for the current user determination fails to meet the confidence threshold for the executing application or for content being presented to the user.

It should likewise be appreciated that according to one alternative example embodiment, the task manager 275 will minimally cause the processor to consider whether or not termination of an application is a detrimental event. According to this alternative example, this is accomplished by consulting the "err in favor" field 355 included in the application/content allows table 300. In the case where a particular application is flagged with an err in favor indicator, the task manager 275 will not immediately terminate execution of a particular application or presentation of particular content when the confidence level for the current user fails to meet the confidence threshold for the executing application or content.

In yet another alternative example embodiment, the task manager 275 minimally causes the processor 200 to verify the identity of a current user when the confidence level for the current user fails to meet the confidence threshold. Once a user is verified, this alternative example embodiment of a task manager 275 further minimally causes the processor to terminate execution of the application or presentation of particular content when the verified user is not entitled to use the application or enjoy the content. According to one alternative example embodiment, the task manager 275 causes the processor to verify the identity of a current user by minimally causing the processor to direct to the user interface a request for the user to execute another application. In this manner, additional application-level usage indicators are received from the usage monitor 270 when a user begins executing a different application. A current user determination can then be refined according to the application-level usage indicators that are received as the user executes another application. In yet another alternative example embodiment, the task manager 275 causes the processor to verify the identity of a user by minimally causing the processor to direct to the user interface 220 the request for the user to execute a password protected application. As such, a current user determination is then refined once a password indicator is received from the usage monitor.

FIG. 14 further illustrates that according to one alternative example embodiment, an execution platform includes the profile generator 280. When executed by the processor 200, the profile generator 280 minimally causes the processor to generate a user profile according to application-level usage indicators received 355 from the usage monitor 270. The profile generator 280 further minimally causes the processor to store 385 the user profile in the user profile table 285 stored in the memory. According to one alternative example embodiment, the profile generator 280 causes the processor 200 to generate a user profile during a registration commensurate with the teachings of the present method. In yet another alternative example embodiment, the profile generator 280 causes the processor to generate a user profile midway by directing a login screen to the user interface 220 and receiving a user identifier and a password from the login screen. The profile generator 280 then minimally causes the processor to receive one or more application-level usage indicators 355 from the usage monitor 270. A user profile is then generated for the user identifier and is updated according to the one or more application-level usage indicators. Such a user, which is identified according to the user identifier and a password, is identified as the predominant user when the user profile generator for such user meets a minimum confidence level.

It should be further noted that the usage monitor 270 of the various embodiments disclosed herein receives 345 commands and other data from the executable application. It should be further noted that such usage monitor 270 is typically integral to an operating system and causes the processor to receive these commands and other data from the executable application in a background mode. Typically, the usage monitor 270 will simply monitor the activity between the executable application 245 and various operating system facilities that enable the user interface, network interface and file access. Accordingly, such an embodiment of a usage monitor 270 will not require any modification to any particular executable application. Likewise, the task manager 275 will simply terminate an executable application according to the techniques and teachings of the present method. According to such alternative example embodiment, the executable application, including any one of an e-mail client, a content presentation application, a word processor, a Web browser and any other application comprises a standard executable application and does not require any specific modifications thereto in order support the techniques and teachings of the present method.

While the present method and apparatus has been described in terms of several alternative and exemplary embodiments, it is contemplated that alternatives, modifications, permutations, and equivalents thereof will become apparent to those skilled in the art upon a reading of the specification and study of the drawings. It is therefore intended that the true spirit and scope of the claims appended hereto include all such alternatives, modifications, permutations, and equivalents.

What is claimed is:

1. A method for authenticating the usage of an application, the method comprising:
    receiving, from a user device, a request to execute a first application;
    executing, on the user device, the first application in response to the request;
    executing, on the user device, a second application in response to the request;
    receiving, from the user device, an application-level usage indicator, wherein the application-level usage indicator corresponds to current operation of the second application by a user and comprises at least (i) user input commands and (ii) passive usage metrics;
    determining the identity of the user by comparing the application-level usage indicator with a pre-established user profile wherein the user profile is associated with previous operation of the second application by the user and comprises at least (i) user input commands and (ii) passive usage metrics; and
    terminating, at the user device, execution of the first application if the identified user is not entitled to use the application according to the user profile.

2. The method of claim 1, wherein receiving an application-level usage indicator comprises receiving an email application usage indicator including at least one of an email client password, a mail recipient indicator, and a mail sender indicator.

3. The method of claim 1, wherein receiving an application-level usage indicator comprises receiving a content presentation application usage indicator including at least one of an access password, a content file-open indicator, a presentation time indicator, and a content navigation indicator.

4. The method of claim 1, wherein receiving an application-level usage indicator comprises receiving a word processing application usage indicator including at least one of a document navigation indicator, a document file-open indicator, and a document file-save indicator.

5. The method of claim 1, wherein receiving an application-level usage indicator comprises receiving a web browser application usage indicator including at least one of a web-page address indicator, and a web-page dwell indicator.

6. The method of claim 1, wherein terminating execution of the first application further comprises:
    determining a user identity confidence level based on the comparison of the application-level usage indicator with the pre-established user profile; and
    terminating execution of the first application if the identified user is not entitled to use the first application based on the user profile and if the user identity confidence level fails to meet a minimum confidence level for the first application.

7. The method of claim 1, wherein terminating execution of the first application further comprises:
    determining a user identity confidence level based on the comparison of the application-level usage indicator with the pre-established user profile; and
    requesting additional identity information from the user if the user identity confidence level fails to meet a minimum confidence level for the first application.

8. The method of claim 7, wherein the second application is password-protected and requesting additional identity information from the user comprises:
    receiving a password from the user upon executing the second application; and
    refining the determination of the identity of the user by comparing the received password with a pre-established user profile, wherein the user profile is associated with previous operation of the second application and comprises at least a predefined password.

9. The method of claim 1, further comprising creating a user profile based on one or more application-level usage indicators received from the user device during a registration period of the first application.

10. The method of claim 1, further comprising:
    identifying the user through a login process if a predominate user of the first application has not yet been determined;
    receiving, from the user device, an application-level usage indicator corresponding to current operation of the first application by a user and comprising at least (i) user input commands and (ii) passive usage metrics;

creating a user profile for the identified user based on the application-level usage indicator corresponding to the current operation of the first application by the user; and determining that the identified user is the predominate user when the user profile meets a minimum confidence level for the first application.

11. The method of claim 1, wherein the passive usage metrics comprise a length of time that the application has been executing, a length of time that the application has displayed a particular piece of content, a timestamp that the application was executed, or any combination thereof.

12. A system for authenticating the usage of an application, the system comprising:

a computing device including a processor capable of executing an application execution module, the application execution module configured to:

receive a request to execute a first application;

execute the first application in response to the request;

execute a second application in response to the request;

receive an application-level usage indicator, wherein the application-level usage indicator corresponds to current operation of the second application by a user and comprises at least (i) user input commands and (ii) passive usage metrics;

determine the identity of the user by comparing the application-level usage indicator with a pre-established user profile wherein the user profile is associated with previous operation of the second application by the user and comprises at least (i) user input commands and (ii) passive usage metrics; and terminate execution of the first application if the identified user is not entitled to use the first application according to the user profile.

13. A system for authenticating the usage of an application, the system comprising:

means for receiving, from a user device, a request to execute a first application;

means for executing, on the user device, the first application in response to the request;

means for executing, on the user device, a second application in response to the request;

means for receiving, from the user device, an application-level usage indicator, wherein the application-level usage indicator corresponds to current operation of the second application by a user and comprises at least (i) user input commands and (ii) passive usage metrics;

means for determining the identity of the user by comparing the application-level usage indicator with a pre-established user profile wherein the user profile is associated with previous operation of the second application by the user and comprises at least (i) user input commands and (ii) passive usage metrics; and means for terminating, at the user device, execution of the first application if the identified user is not entitled to use the first application according to the user profile.

14. A computer program product, tangibly embodied in a non-transitory computer-readable storage medium, for authenticating the usage of an application, the computer program product including instructions executable to cause a data processing apparatus to:

receive, from a user device, a request to execute a first application;

execute, on the user device, the first application in response to the request;

execute, on the user device, a second application in response to the request;

receive, from the user device, an application-level usage indicator, wherein the application-level usage indicator corresponds to current operation of the second application by a user and comprises at least (i) user input commands and (ii) passive usage metrics;

determine the identity of the user by comparing the application-level usage indicator with a pre-established user profile wherein the user profile is associated with previous operation of the second application by the user and comprises at least (i) user input commands and (ii) passive usage metrics; and terminate, at the user device, execution of the first application if the identified user is not entitled to use the first application according to the user profile.

15. A system for authenticating the usage of an application, the system comprising:

a computing device comprising:

a processor capable of executing an instruction sequence;

a user interface capable of receiving user input and displaying information to a user;

a memory capable of storing an instruction sequence;

one or more instruction sequences stored in the memory including:

a first executable application that, when executed by the processor, minimally causes the processor to perform an application function;

a second executable application that, when executed by the processor, minimally causes the processor to perform an application function;

an application-level usage monitor that, when executed by the processor, minimally causes the processor to create an application-level usage indicator, wherein the application-level usage indicator corresponds to current operation of the second executable application by a user and comprises at least (i) user input commands and (ii) passive usage metrics;

a task manager that, when executed by the processor, minimally causes the processor to determine the identity of the user by comparing the application-level usage indicator with a pre-established user profile wherein the user profile is associated with previous operation of the second executable application by the user and comprises at least (i) user input commands and (ii) passive usage metrics, wherein the task manager further minimally causes the processor to terminate execution of the first executable application if the identified user is not entitled to use the first executable application according to the user profile.

16. The system of claim 15, wherein the second executable application comprises an email client and wherein the application-level usage monitor causes the processor to create an application-level usage indicator including at least one of an e-mail password, a mail recipient for an email sent to a server by the e-mail client, and a mail sender for an e-mail received by the e-mail client from a server.

17. The system of claim 15, wherein the second executable application comprises a content presentation application and wherein the application-level usage monitor causes the processor to create an application-level usage indicator including at least one of a password, a content file-open command, a content navigation command, a play command and a stop-play command.

18. The system of claim 15, wherein the second executable application comprises a word processor and wherein the application-level usage monitor causes the processor to create an application-level usage indicator including at least one of a password, a document file-open command, a navigation command, and a document file-save command.

19. The system of claim 18, further comprising:
a network interface capable of receiving a request web page and wherein the second executable application comprises a web browser and wherein the application-level usage monitor causes the processor to create an application-level usage indicator including at least one of a web-page address included in a web-page request directed to the network interface and an amount of time between consecutive web-page requests.

20. The system of claim 15, wherein the task manager causes the processor to determine an identity of the user and terminate execution of the first executable application by minimally causing the processor to:
determine a user identity confidence level based on the comparison of the application-level usage indicator with the pre-established user profile; and
terminate execution of the first executable application if the identified user is not entitled to use the first application based on the user profile and the user identity confidence level fails to meet a minimum confidence level for the first executable application.

21. The system of claim 15, wherein the task manager causes the processor to determine an identity of the user and terminate execution of the first executable application by minimally causing the processor to:
determine a user identity confidence level based on the comparison of the application-level usage indicator with the pre-established user profile; and
request additional identity information from the user if the user identity confidence level fails to meet a minimum confidence level for the first application.

22. The system of claim 21, wherein the second executable application is password-protected and the task manager causes the processor to request additional identity information from the user by minimally causing the processor to:
receive a password from the usage monitor upon executing the second executable application; and
refine the determination of the identity of the user by comparing the received password with a pre-established user profile, wherein the user profile is associated with previous operation of the second executable application and comprises at least a predefined password.

23. The system of claim 15, further comprising a user profile generator instruction sequence stored in the memory that, when executed by the processor, minimally causes the processor to generate a user profile according to application-level usage indicators received from the usage monitor during a registration period of the first executable application.

24. The system of claim 15, further comprising a user profile generator instruction sequence stored in the memory that, when executed by the processor, minimally causes the processor to generate a user profile by minimally causing the processor to:
direct a login screen to the user interface if a predominate user of the first executable application has not yet been determined;
receive a user identifier and password from the login screen and identify the user based on the user identifier and password;
receive one or more application-level usage indicators from the usage monitor, the application-level usage indicators corresponding to current operation of the first executable application by a user and comprising at least (i) user input commands and (ii) passive usage metrics;
create a user profile for the identified user based on the application-level usage indicator corresponding to the current operation of the first executable application by the user; and
determine that the identified user is the predominate user when the user profile meets a minimum confidence level for the first executable application.

* * * * *